Sept. 26, 1950     F. W. KAISER     2,523,574
SWING SUPPORT
Filed May 12, 1947

Inventor
Frederick W. Kaiser

By *Clarence A. O'Brien and Harvey B. Jacobson*
Attorneys

Patented Sept. 26, 1950

2,523,574

UNITED STATES PATENT OFFICE 2,523,574

SWING SUPPORT

Frederick W. Kaiser, Merino, Colo.

Application May 12, 1947, Serial No. 747,444

2 Claims. (Cl. 155—58)

The present invention relates to new and useful improvements in swings of the single seat-type having overhead suspension means, and more particularly to a novel construction of the suspension means to reduce wear thereof at its point of attachment to an overhead supporting structure as well as at its point of attachment to the seat.

A further object of the invention is to provide means for easily and quickly attaching the seat suspension means or chains of the swing to an overhead supporting structure.

A further object is to provide swing supporting means of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
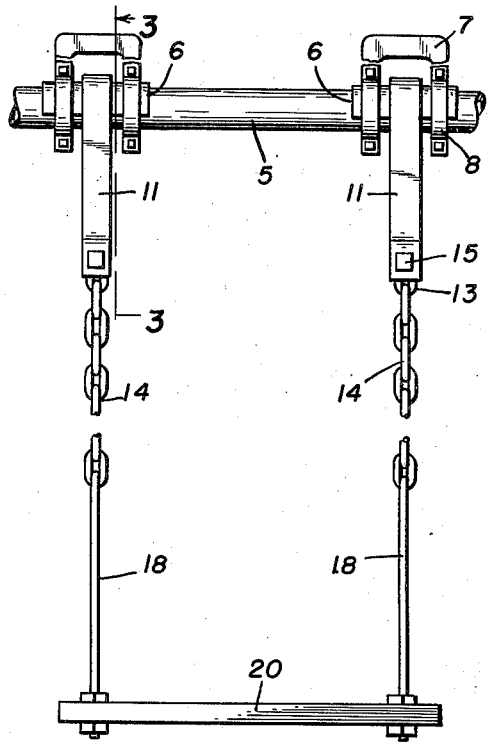
Figure 1 is a front elevational view of a swing constructed in accordance with the present invention.
Figure 2:
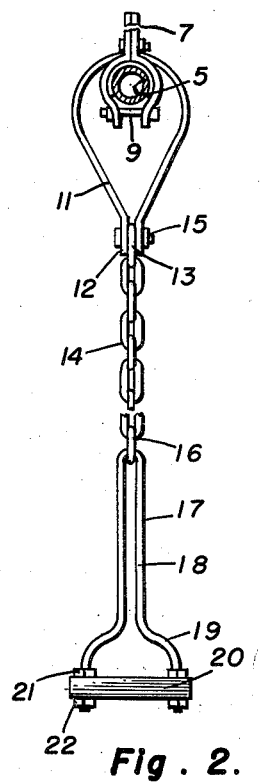
Figure 2 is a side elevational view.
Figure 3:
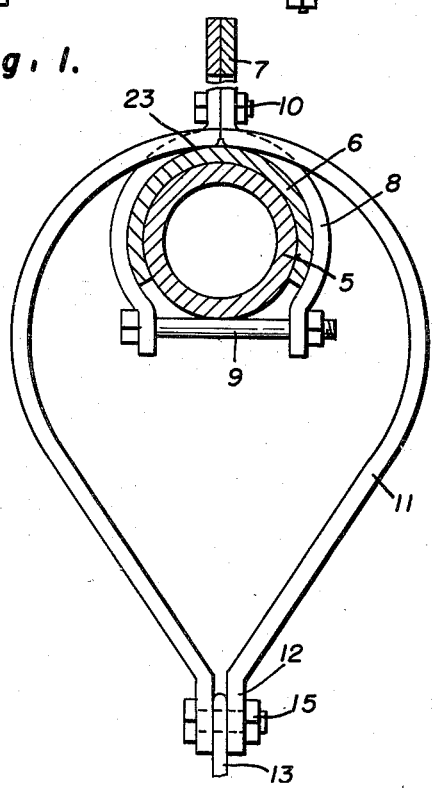
Figure 3 is an enlarged fragmentary sectional view taken on a line 3—3 of Figure 1.

Referring now to the drawing in detail wherein, for the purpose of illustration, I have disclosed a preferred embodiment of the invention, the numeral 5 designates an overhead pipe or bar such as commonly used for hanging a swing thereon, the pipe having a pair of semi-cylindrical wear plates 6 positioned at longitudinally spaced intervals thereon.

Each wear plate is secured in position by a double, laminated U-shaped clamp 7 arranged in inverted position and having each end constructed to provide a split clamp 8 embracing the pipe 5 adjacent each end of the wear plate 6. The lower ends of each of the split clamps 8 are secured to each other in clamping engagement on the pipe by a bolt and nut 9 and the sections of the clamp are secured to each other above the pipe by bolts and nuts 10 to hold the bight portion 7 of the clamps spaced above the wear plates 6.

A loop 11 constructed of a single piece of strap metal is placed over each of the wear plates 6 between the legs 8 of the clamps, the ends of the strap forming the loop extending downwardly and bent in parallel relation with respect to each other, as shown at 12, and between which is positioned the upper link 13 of a chain 14 and which is secured to the ends of the strap forming the loop by a bolt and nut 15.

The lower link 16 of the chain is engaged in the upper end of an inverted U-shaped seat connector 17, the legs of the connector at its upper portion extending in parallel relation to each other, as shown at 18, and the lower ends of the legs are curved outwardly from each other, as shown at 19, and extend downwardly through a seat 20 adjacent the front and rear edges of the seat and at the ends thereof. The lower ends of the connector 17 are tightly secured to the seat by upper and lower nuts 21 and 22 threaded on the ends of the connector.

Each end of the seat 20 is provided with one of the hangers composed of the loop 11, chain 14 and connector 17, as above described, the chain 14 forming a flexible connection between the loop 11 and connector 17.

The upper link 13 of the chain is held securely between the ends 12 of the loop 11 to prevent wear at the upper end of the chain by rubbing against the lower edges of the loop.

The loop 11 is of a diameter substantially greater than the diameter of the pipe 5 so that only a relatively small internal area of the loop rests on the wear plate 6, as shown at 23, whereby friction is reduced and wear on the loop as well as on the wear plate is also reduced to a minimum.

The connector 17 is of a length to rise a substantial distance above the seat 20 whereby to provide a hand grip at the upper parallel leg portions 18 of the connector for a child occupying the seat, thus eliminating the danger of pinching the fingers of the child by the links of the chain.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

What I claim as new is:

1. A swing support comprising wear plates, means for removably positioning said wear plates upon a support bar, a bowed strap suspended on each of said wear plates, a bolt interconnecting the free ends of said strap, a flexible member suspended at its upper end to said bolt and between said strap ends, and a link interconnecting the lower end of said flexible member and a seat, said links including an elongated inverted U-shaped member and arcuated members curved outwardly from each other and depending from the free ends of the legs of said U-shaped member.

2. The combination of claim 1 wherein said means includes a U-shaped bar and a pair of split clamps carried by the legs of said bar engaging said wear plates and the support bar.

FREDERICK W. KAISER.

REFERENCES CITED

The following references are of record in the file of this patent:

UNITED STATES PATENTS

| Number | Name | Date |
|---|---|---|
| 1,599,656 | Crowley | Sept. 14, 1926 |
| 2,225,737 | De Yaney | Dec. 24, 1940 |

FOREIGN PATENTS

| Number | Country | Date |
|---|---|---|
| 6,651 | Great Britain | 1914 |